United States Patent

Weger

[15] 3,699,443

[45] Oct. 17, 1972

[54] RADIO CONTROL AND REPEATER COMMUNICATION SYSTEM

[72] Inventor: Ronald E. Weger, 3218 South Cambridge Road, Lansing, Mich. 48910

[22] Filed: March 2, 1970

[21] Appl. No.: 15,670

[52] U.S. Cl. ............................325/4, 325/6, 325/55, 325/64, 325/66, 325/183

[51] Int. Cl. ................................................H04b 7/20

[58] Field of Search............325/64, 55, 66, 183, 4, 5, 325/6, 10, 13; 340/147; 343/225, 228

[56] References Cited

UNITED STATES PATENTS

| | | | |
|---|---|---|---|
| 3,581,208 | 5/1971 | Buehrle | 325/64 |
| 3,290,597 | 12/1966 | Denny et al. | 325/183 |
| 2,355,607 | 8/1944 | Shepherd | 325/64 |
| 3,508,202 | 4/1970 | Joel, Jr. | 340/147 |

OTHER PUBLICATIONS

Lafayette Cat. No. 681, July 1967 Lafayette Radio Elec. III Jericho Tpk, Syosset, L.I. N.Y. 11791.

*Primary Examiner*—Robert L. Richardson
*Assistant Examiner*—Kenneth W. Weinstein
*Attorney*—Malcolm R. McKinnon

[57] ABSTRACT

A communications system particularly adapted for use by police officers and including a portable transceiver, first and second mobile transceivers, and a recording unit. Code generator means is provided which is operatively associated with the portable transceiver. Decoding and switching means is also provided which is controlled by the code generator means and which selectively controls the first and second mobile transceivers and the recording unit. Additional auxiliary safety units may also be provided which are controlled by the code generator means and the decoding and switching means.

16 Claims, 2 Drawing Figures

INVENTOR
RONALD E. WEGER

BY *Miller, Morriss, Pappas & McLeod*
ATTORNEYS

RADIO CONTROL AND REPEATER COMMUNICATION SYSTEM

BRIEF SUMMARY OF THE INVENTION

This invention relates to communications systems and, more particularly, to an improved communications system particularly adapted for use by law enforcement officers, security personnel, governmental agencies and other persons who find it expedient to utilize communications systems involving mobile units.

As is well known in the art, police officers, security personnel, governmental agents and other persons have utilized mobile radio communication systems to provide communications between patrol vehicles and a remote central station. For example, such radio communications systems are provided between police patrol cars and a central station and when used, for example, by state police agencies have a relatively long range capability providing communications between points many miles apart. As is also well known in the art, police foot patrol officers have utilized portable or walkie-talkie type radio transceivers for limited range radio communications between individual officers or between an individual officer and a relatively close central station, as for example, a central station located in an urban area. The personal security of patrol car officers is significantly reduced through loss of communications capability when such an officer leaves his patrol vehicle for investigatory or other purposes since such an officer even a few feet away from his patrol vehicle is unable to utilize the vehicular radio for communications purposes. In addition, foot patrol officers equipped with walkie-talkie type transceivers having a maximum range, at best, of only a few miles over unobstructed terrain often are without communications capability when they enter buildings or when they are located in areas which are obstructed from the central station by buildings, hills or other obstructions located between the foot patrolmen and the central station. Moreover portable or walkie-talkie type transceivers are of little value in remote or rural areas such as are normally patrolled by state police and sheriff's departments because of the extremely limited range of such portable transceivers. Consequently, heretofore, both patrol car officers and foot patrolmen in hazardous or dangerous positions have often been without communications capability and unable to call for assistance or otherwise communicate with a central station or other officers.

Heretofore, difficulties have also arisen as a result of the interrogation of various individuals by police officers, and often allegations are made subsequent to the confrontation between the police officer and such interrogated individuals charging arrogance or brutality on the part of the police officer or the use of abusive language or threats of violence on the part of the person interrogated. Since there is often an absence of disinterested witnesses, it is extremely difficult if not impossible for reviewing authorities to ascertain what actually occurred during the confrontation between the police officer and the person or persons being interrogated by him.

An object of the present invention is to overcome disadvantages in prior communications systems of the indicated character and to provide an improved communications system which increases the safety of police officers in the field.

Another object of the present invention is to provide an improved communications systems which enables a police officer to maintain communications capability when he is separated from a patrol vehicle or in an area with a limited radio range.

Another object of the invention is to provide an improved communications system incorporating means facilitating the recording of events encountered by a police officer in the field.

Another object of the invention is to provide an improved communications system incorporating improved means which enables a police officer to actuate remote auxiliary safety devices while voluntarily or involuntarily separated from a patrol car.

Another object of the invention is to provide an improved communications system which facilitates the identification of persons encountered by police officers.

Another object of the invention is to provide an improved communications system which may be utilized as a supervisory or reviewing aid in police activities.

Another object of the invention is to provide an improved communications system which facilitates the simultaneous transmission and recording of aural intelligence.

Another object of the invention is to provide an improved communications system which facilitates the training and supervision of police officers and other field personnel.

Still another object of the invention is to provide an improved communications system which enables a police officer in the field to obtain assistance and information in a minimum of time.

Yet another object of the invention is to provide an improved communications system which facilitates the location of disabled officers or officers under involuntary restraint.

The above as well as other objects and advantages of the present invention will become apparent from the following description, the appended claims and the accompanying drawing.

DETAILED DESCRIPTION

Figure 2:
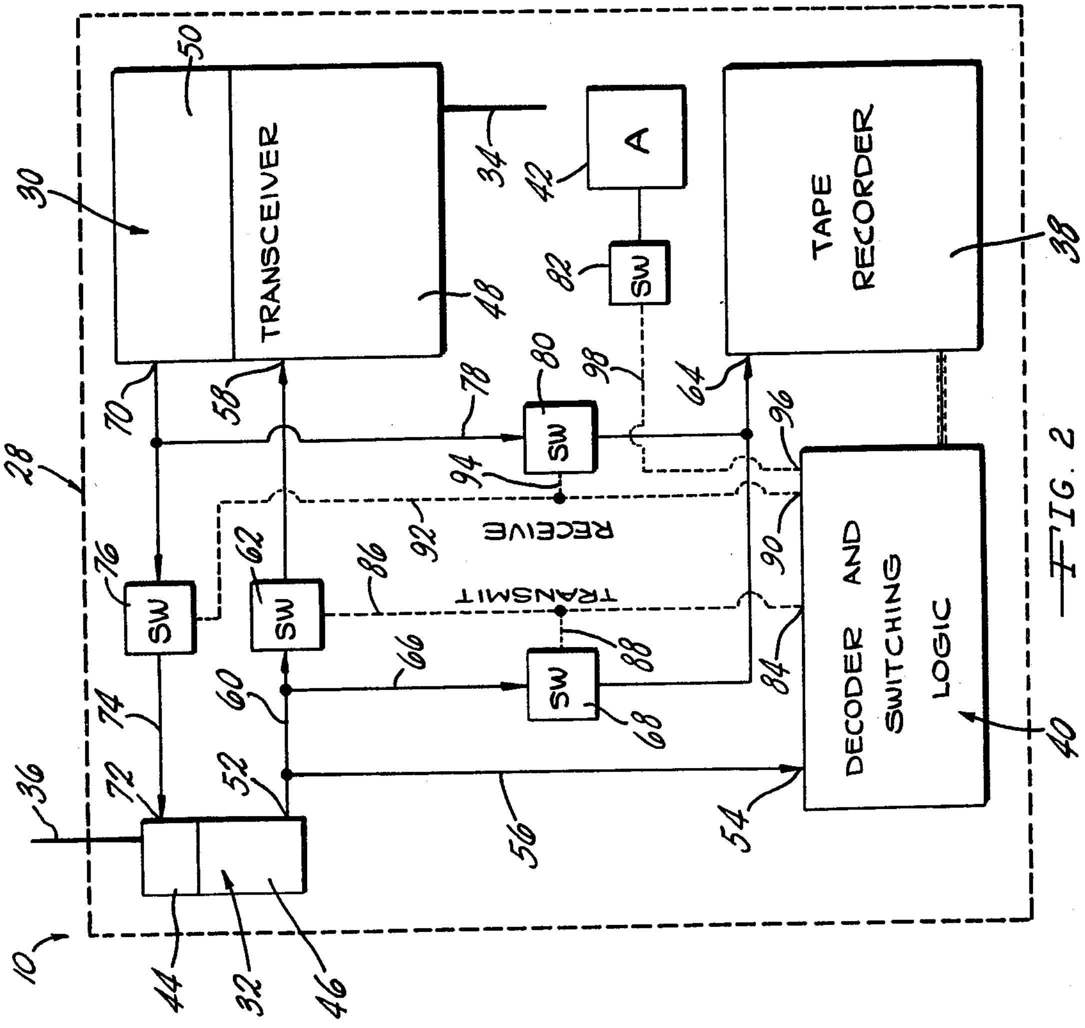
FIG. 2 is a schematic view of mobile components of the communications system embodying the present invention.
Figure 1:
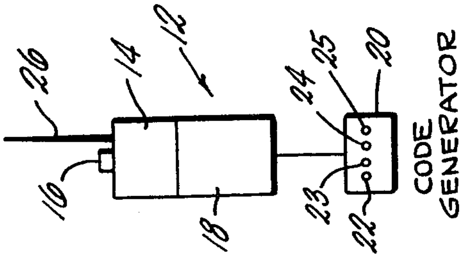
FIG. 1 is a schematic view of a portable transceiver and associated encoder included in a communications system embodying the present invention.

Referring to the drawings, the present invention is illustrated as embodied in a communications system generally designated 10 which is particularly adapted for use by police officers although it will be understood that the present invention is applicable to other uses. For example, the present invention may be utilized by private security personnel, by various governmental agents and by other persons who have heretofore found it expedient to utilize communications systems involving mobile units. The communications system 10 is comprised of a portable transceiver and code generator unit 12 which is adapted to be carried personally by a police officer, the unit 12 including a transmitter portion 14, a microphone 16 which is connected to the input of the transmitter 14, a receiver portion 18, and a code generator 20 actuated by suitable push buttons such as 22, 23, 24 and 25, the output of the code generator 20 being connected to the input of the transmitter portion 14 of the unit 12. If desired the unit 12 may also include an extensible antenna 26 connected to the transmitter 14 and receiver 18 in a conventional manner and functioning to extend the range of operation to the unit 12.

In the embodiment of the invention illustrated the communications system 10 also includes a mobile unit, generally designated 28, which is adapted to be installed in a conventional police vehicle such as an automobile, helicopter, boat or other vehicle. The mobile unit 28 includes a conventional transceiver 30 of the type conventionally utilized in police patrol cars and adapted to transmit radio signals to and receive radio signals from a central transmitting and receiving station (not shown) of the type conventionally utilized by police agencies and operating on radio frequencies normally assigned thereto. The mobile unit 28 also includes a transceiver 32 adapted to transmit radio signals to and receive radio signals from the portable unit 12, the units 12 and 32 preferably operating on different radio frequencies than the transceiver 30. The transceiver 30 and transceiver 32 are provided with suitable antennas 34 and 36, respectively, correlated with the operating frequencies of the associated transceivers. The mobile unit 28 also includes a conventional tape recorder 38 and a decoder and switching logic unit 40 adapted to receive and decode signals generated by the code generator 20, the unit 40 also functioning to selectively connect the units 30, 32 and 38 through the agency of switching means which will be described hereinafter in greater detail. If desired, the mobile unit 28 may also include auxiliary safety devices, generally designated 42, adapted to be remotely actuated by the unit 12. The auxiliary unit 42 may take the form of a siren, flashing light, loud speaker, spotlight, electric door lock, camera, portable television transmitter or other safety devices as desired.

The unit 12 is preferably powered by conventional batteries such as dry cells or conventional rechargeable batteries and may, if desired, be made relatively unobstrusive by incorporating the unit in a police officers citation book or in a carrying case concealable on the officer or person carrying the unit 12. The transmitting portion 14, microphone 16 and receiving portion 18 of the unit 12 are of conventional design and may be of the type conventionally utilized in commercially available walkie-talkie units. The code generator 20 is also of conventional and commercially available construction and preferably of the type adapted to generate digital signals of limited time duration. In the embodiment of the invention illustrated the digital signal output of the code generator 20 is transmitted by the transmitting portion 14 of the unit 12 when the code generator and transmitter portion are energized, the digital signal being transmitted to the unit 40 for approximately one-half second after which the unit 12 may the utilized for voice transmission and receiving purposes without interference from the code generator 20.

The mobile unit 28 is preferably powered by the battery normally provided in the vehicle electrical system, although a separate power supply may be provided if desired. The unit 32 includes a transmitting portion 44 and a receiving portion 46 which are also of conventional design and commercially available, the transmitting and receiving portions 44 and 46 of the unit 32 being adapted to transmit and receive on the same frequencies as the portable unit 12 so that transmissions from the transmitter 14 of the unit 12 are received by the receiver portion 46 of the unit 32 and transmissions from the transmitter 44 of the unit 32 are received by the receiver portion 18 of the unit 12.

The transceiver 30 includes a transmitting portion 48 and a receiver portion 50, the transmitting portion 48 and receiving portion 50 being adapted to send and receive voice transmissions from the central station (not shown).

The output 52 of the receiver 46 is connected to the input 54 of the unit 40 by a line 56 in the embodiment of the invention illustrated whereby a digital code generated by the code generator 20 is transmitted from the transmitter portion 14 of the unit 12 to the receiver portion 46 of the unit 32 and then to the decoder and switching logic unit 40 through the line 56. It will be understood however that, if desired, the code generator 20 may transmit directly to the decoder and switching logic unit 40 by utilizing conventional code generating and decoding units operating on inaudible sound frequencies of the type conventionally utilized to operate remotely controlled television sets and garage doors.

The output 52 of the receiver unit 46 is also connected to the input 58 of the mobile transmitter 48 by a line 60, a switch 62 controlled by the unit 40 being interposed between the output 52 of the receiver 46 and the input 58 of the transmitter 48. The output 52 of the receiver 46 is also connected to the input 64 of the tape recorder 38 by a line 66, a switch 68 controlled by the unit 40 being interposed between the output 52 of the receiver 46 and the input 64 of the recorder 38. The output 70 of the mobile receiver 50 is connected to the input 72 of the transmitter 44 by a line 74, a switch 76 controlled by the unit 40 being interposed between the output 70 and the input 72 of the transmitter 44. The output 70 of the receiver 50 is also connected to the input 64 of the tape recorder 38 by a line 78 having a switch 80 therein controlled by the decoder and switching logic unit 40.

The auxiliary safety unit 42 is also adapted to be actuated by a switch 82 controlled by the unit 40.

In the embodiment of the invention illustrated the output terminal 84 of the decoder and switching logic unit 40 is connected to the switch 62 by a line 86 and to the switch 68 by a branch line 88 while the output terminal 90 of the unit 40 is connected to the switch 76 by a line 92 and to the switch 80 by a branch line 94. The output terminal 96 of the unit 40 is connected to the switch 82 by a line 98. It will be understood that any number of auxiliary safety units such as 42 may be controlled by the switch 82. For example if it is desired, the switch 82 may control the energization of the vehicle siren, the vehicle flashing lights and the vehicle electric door locks. In the alternative, additional output terminals may be provided on the unit 40 and additional switches such as 82 provided for each of the individual auxiliary safety devices which it is desired to utilize, such devices including the vehicle siren, flashing lights, spotlight, electric door locks and other desired auxiliary safety units. It will also be understood that one or both of the outputs 52 and 70 may be connected to a loudspeaker such as those conventionally provided on the exterior of police cars whereby transmissions from the portable unit 12 as well as transmissions from the central station may be broadcast over the vehicle loudspeaker.

In the operation of the communications system 10, assuming that the portable unit 12 is carried by a police officer who finds it necessary or expedient to leave his police patrol car equipped with the mobile unit 28, as for example, when a patrol car officer stops a motorist and the officer desires to interrogate the motorist. The officer may leave his vehicle carrying the portable unit 12 and approach the vehicle which the officer has stopped. Assuming that the officer encounters difficulties with the detained motorist or other occupants of the stopped vehicle, the officer may push the button 22 whereby the code generator 20 generates a digital code which is transmitted by the transmitter portion 14 of the unit 12 to the receiver portion 46 of the unit 32 from which the digital code flows to the input 54 of the decoder and switching logic unit 40 through the line 46. Depression of the button 22 may, for example, be effective to generate a code of limited time duration which when decoded by the unit 40 is effective to actuate the switch 62 whereby the input 58 of the transmitter 48 is connected to the output 52 of the receiver 46. The officer may then speak into the microphone 16 so that he is in voice communication through the transmitter 14 of the unit 12 with the receiver 46 of the unit 32, such transmission preferably being effected between the antenna 26 and the antenna 36 of the units 12 and 32, respectively, and the transmission received by the receiver 46 is immediately transmitted to the input 58 of the transmitter 48 through the line 60 and retransmitted by the transmitter 48 through the antenna 34 to the central station with the result that the police officer carrying the portable unit 12 is able to communicate directly with the central station over relatively long distances involving many miles because of the transmission capabilities of the transmitter 48.

If the officer desires or has been instructed to have his transmission recorded, he may depress the button 23 whereupon the code generator 20 generates a digital code which is transmitted from the transmitter 14 to the receiver 46 in the manner previously described, the digital code being received from the output 52 of the receiver 46 by the decoder and switching logic unit 40 through the line 56 and being effective to actuate the switch 68 through the output 84 and lines 86 and 88 so that the output 52 of the receiver 46 is connected to the input 64 of the recorder 38 through the lines 60 and 66. The mobile unit 28 is then capable of simultaneously transmitting and recording a message received from the portable unit 12. The transceivers 12 and 30 are preferably of the push-to-talk type whereas the transceiver 32 is preferably of the push-to-listen type. Thus when the buttons 22 and 23 are depressed the transmitter 14 is in an energized condition and the code generator 20 is effective to energize the receiver 46 and the transmitter 48. The button 24 is associated with the switches 76 and 80 and when the button 24 is depressed, the transmitter 14 is deenergized, the receive 18 is energized, the transmitter 44 is energized, the receiver 46 is deenergized, the transmitter 48 is deenergized and the receiver 50 is energized. Consequently the central station may immediately communicate with the officer carrying the portable unit 12. A transmission from the central station is received by the receiver 50 the output 70 of which is connected to the input 72 of the transmitter 44 through the switch 76 which may be closed by depressing the button 24 of the code generator 20. The signal received by the transmitter 44 from the receiver 50 is then transmitted from the antenna 36 to the antenna 26 where it is received by the receiver 18 of the portable unit 12. The output of the receiver 50 is also connected to the input 64 of the recorder 38 through the switch 80 by the line 78 with result that the transmission from the central station is also recorded on the tape recorder 38.

The portable unit 12 may also be utilized to transmit and simultaneously record conversations between the police officer and the persons being interrogated by such officer thus providing a record of the interrogation conversation which enables supervising or reviewing authorities to ascertain what actually occurred during the confrontation between the police officer and person or persons being interrogated by him. Such recording of the interrogated person's voice may also enable subsequent identification of such person through the agency of voice prints.

The portable unit 12 also materially increases the communications range capability of foot patrolmen since transmissions emanating from a portable unit 12 carried by a foot patrolman, even when he is in a building or other area with limited radio range, may be received by a mobile unit contained in a police patrol car operating in the area and retransmitted to a central station. The foot patrolman operating in remote or limited radio reception areas may also receive instructions from a central station through a mobile unit 28 operating in the vicinity of the foot patrolman.

When a police officer is in difficulty away from his patrol car he may also utilize the communications system 10 to seek immediate assistance by energizing auxiliary safety devices such as a police patrol car siren, the patrol car flashing lights and the like by depressing the button 25 which actuates the code generator 20 so that the code generator 20 transmits a digital signal which is received by the decoder and switching logic unit 40 in the manner previously described, the unit 40 then actuating the switch 82 so as to energize the auxiliary safety device 42. It will be appreciated that if a police officer is being involuntarily restrained or attacked while away from his patrol car, the remote energization of the police patrol car and flashing lights may be effective to attract bystanders to the aid of the patrolman and may also be effective to disuade the attacker from pursuing his attack on the patrolman. Remote energization of electrical vehicle door locks would also prevent unauthorized persons from appropriating the patrol vehicle. It will also be appreciated that a disabled officer or an officer under involuntary restraint may be readily located by conventional triangulation methods if the officer is able to actuate the units 12 and 30.

It will also be understood that if for economy or other reasons, it is desired to provide one way transmission capabilities only from the unit 12, then the unit 12 need only be provided with a transmission portion 14 and the unit 32 with a receiver portion 52. Such a construction would enable obvious simplification of the code generator 20 as well as the unit 40.

While a preferred embodiment of the invention has been illustrated and described, it will be understood that various changes and modifications may be made without departing from the spirit of the invention.

What is claimed is:

1. In a communications system, the combination including a portable radio transmitter, a mobile radio receiver adapted to receive radio frequency signals emanating from said portable transmitter and having an output, a mobile radio transmitter having an input selectively connectable to said output of said mobile receiver, said portable and mobile transmitters transmitting on different frequencies, said mobile transmitter being adapted to receive and transmit signals received from said output of said mobile receiver, code generating means operatively associated with said portable transmitter, decoding means controlled by said code generator means, and switching means controlled by said decoding means and operable to energize the mobile transmitter and to connect said output of said mobile receiver to said input of said mobile transmitter.

2. The combination as set forth in claim 1 including recording means having an input, said switching means being operable to connect said output of said mobile receiver to said input of said recording means.

3. The combination as set forth in claim 2, said switching means being operable to connect said output of said mobile receiver simultaneously to said input of said mobile transmitter and said input of said recording means.

4. The combination as set forth in claim 1 including an auxiliary safety unit, said switching means being operable to energize said auxiliary safety unit.

5. The combination as set forth in claim 4 wherein said auxiliary safety unit is in the form of a siren.

6. The combination as set forth in claim 4 wherein said auxiliary safety unit is in the form of a flashing light.

7. The combination as set forth in claim 4 wherein said auxiliary safety unit is in the form of an electrical door lock.

8. In a communications system, the combination including a portable radio transceiver, first and second mobile radio transceivers each having an input and an output, said second mobile transceiver transmitting and receiving on a different frequency than said portable transceiver and said first mobile transceiver, code generating means operatively connected to said portable transceiver, decoding means controlled by said code generating means, and switching means controlled by said decoding means and selectively operable to energize said second mobile transceiver and to connect the output of said first mobile transceiver to the input of said second mobile transceiver.

9. The combination as set forth in claim 8 including a recording unit, said switching means selectively controlling the energization of said recording unit.

10. The combination as set forth in claim 8 said first and second mobile transceivers each having a transmitting portion and a receiving portion, said receiving portion of said first transceiver being selectively connectable with said transmitting portion of said second transceiver, said receiving portion of said second transceiver being selectively connectable with said transmitting portion of said first transceiver, said switching means being operable to connect said receiving portion of said first transceiver with said transmitting portion of said second transceiver and sequentially connect said receiving portion of said second transceiver to said transmitting portion of said first transceiver.

11. The combination as set forth in claim 9, said switching means being operable to connect said receiving portion of said first transceiver to said transmitting portion of said second transceiver and to said recording means.

12. The combination as set forth in claim 9, said switching means being operable to connect said receiving portion of said second transceiver to said transmitting portion of said first transceiver and to said recording means.

13. The combination as set forth in claim 10 including an auxiliary safety unit, said switching means being operable to energize said auxiliary safety unit.

14. The combination as set forth in claim 13, said auxiliary safety unit being in the form of a siren.

15. The combination as set forth in claim 13 wherein said auxiliary safety unit is in the form of a flashing light.

16. The combination as set forth in claim 13 wherein said auxiliary safety unit is in the form of an electrical door lock.

* * * * *